United States Patent [19]
Uchiumi et al.

[11] Patent Number: 5,092,337
[45] Date of Patent: Mar. 3, 1992

[54] ULTRASONIC DIAGNOSTIC APPARATUS

[75] Inventors: Isao Uchiumi, Nishinasunomachi; Susumu Enjoji, Ootawara, both of Japan

[73] Assignee: Kabushiki Kaisha Toshiba, Kawasaki, Japan

[21] Appl. No.: 481,202

[22] Filed: Feb. 20, 1990

[30] Foreign Application Priority Data

Feb. 22, 1989 [JP] Japan .................................. 1-44846

[51] Int. Cl.⁵ .............................................. A61B 8/00
[52] U.S. Cl. .................................. 128/661.01; 73/626
[58] Field of Search .............. 128/660.01, 661.01; 73/625-626

[56] References Cited

U.S. PATENT DOCUMENTS

| | | | |
|---|---|---|---|
| 4,318,413 | 3/1982 | Iinuma et al. | 128/661.01 X |
| 4,372,323 | 2/1983 | Takemura et al. | 128/661.01 |
| 4,628,738 | 12/1986 | Burkhardt et al. | 73/626 |
| 4,677,981 | 7/1987 | Coursant | 128/661.01 |
| 4,811,740 | 3/1989 | Ikeda et al. | 128/660.01 |
| 4,890,267 | 12/1989 | Rudolph | 128/661.01 X |
| 4,962,667 | 10/1990 | Ogawa et al. | 128/661.01 X |

*Primary Examiner*—Francis Jaworski
*Attorney, Agent, or Firm*—Oblon, Spivak, McClelland, Maier & Neustadt

[57] ABSTRACT

An ultrasonic diagnostic apparatus includes a transmit/receive circuit having a plurality of transmit channels for enabling a drive pulse to a corresponding ultrasonic oscillation element and a plurality of receive channels for receiving an ultrasonic signal echoed back from a subject and an ultrasonic probe having a plurality of ultrasonic oscillation elements smaller in number than the number of channels in the transmit/receive circuit. The apparatus further includes a connector for selectively connecting a plurality of transmit channel output terminals in a parallel connection unit to a corresponding ultrasonic oscillation element to drive ultrasonic oscillation elements in parallel fashion or a plurality of receive channel input terminals in parallel connection unit to a corresponding ultrasonic oscillation element in the ultrasonic probe to receive an echo signal via the corresponding plurality of receive channels for processing.

10 Claims, 4 Drawing Sheets

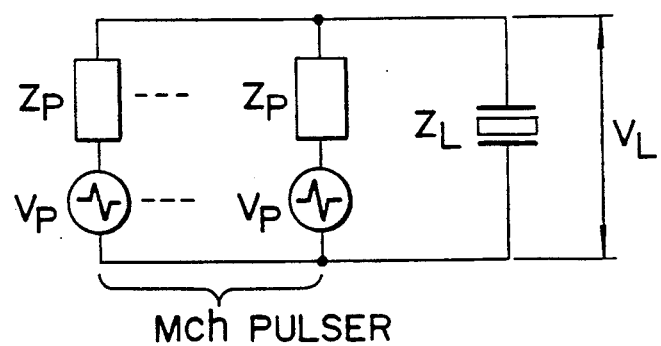
F I G. 1
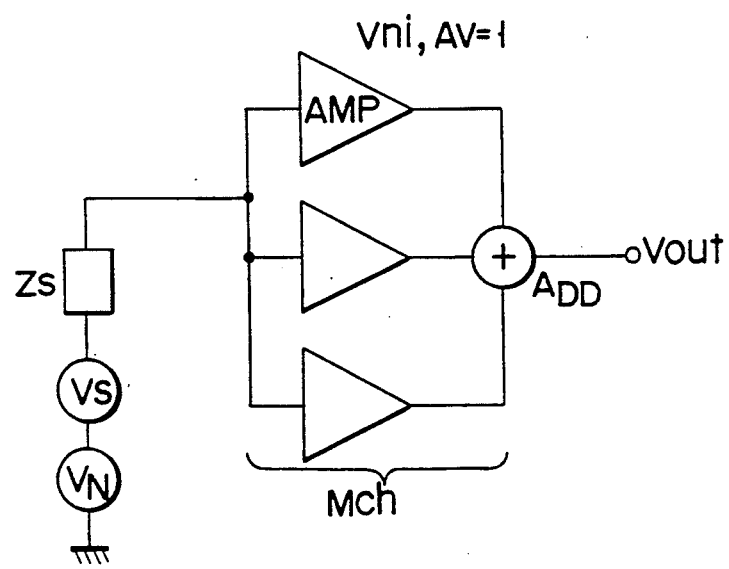
F I G. 2

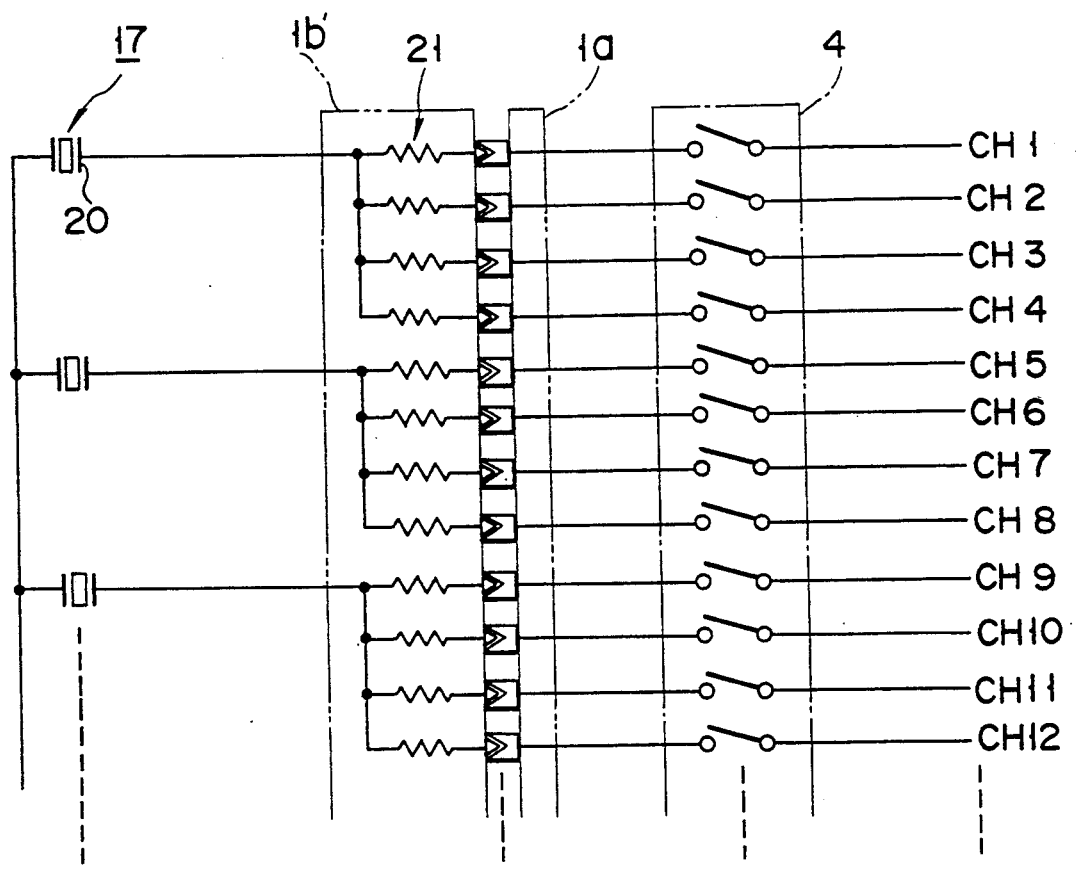
F I G. 6
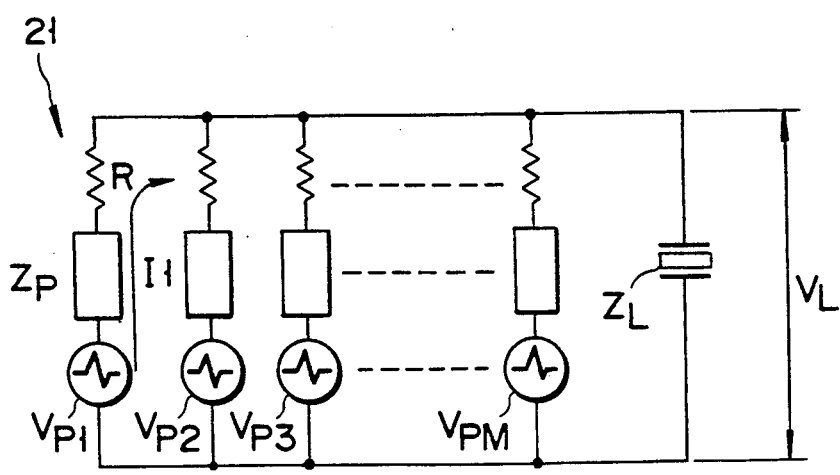
F I G. 7

ULTRASONIC DIAGNOSTIC APPARATUS

BACKGROUND OF THE INVENTION

1. Field of the Invention

The present invention relates to an ultrasonic diagnostic apparatus adapted to make a diagnostic examination by transmitting an ultrasonic wave to a subject and collecting corresponding components echoed back from the subject.

2. Description of the Related Art

The ultrasonic diagnostic apparatus includes an ultrasonic probe which is adapted to transmit an ultra sonic wave toward a subject upon application of a drive pulse (also referred to an excitation pulse) and receive corresponding components echoed back from the subject.

In the diagnostic examination of the subject, different types of ultrasonic probes are prepared for the ultrasonic diagnostic apparatus and are properly and selectively utilized according to which part of the subject is to be examined and to the purpose for which the probe is used.

The ultrasonic diagnostic apparatus is equipped with an ultrasonic probe having an array of ultrasonic oscillation elements for electronic scan, such as a linear scan and sector scan, to be conducted, and includes a transmit/receive circuit having a plurality of transmit channels for allowing a drive pulse to be applied to a corresponding ultrasonic oscillation element and a plurality of receive channels for echo signal processing. The transmit/receive circuit is for an electronic scan type ultrasonic probe only and the input/output impedance etc. are set to an optimal value for the ultrasonic oscillation element of the probe.

There is sometimes the case where it is desired to collect the ultrasonic wave information from a subject with the use of, for example, a mechanical scan type ultrasonic probe in distinct from an electronic scan type ultrasonic probe. The ultrasonic probe for mechanical scan includes, for example, an annular array type composed of a concentric array of ring like ultrasonic oscillation elements for allowing the use of electronic focusing and a single type composed of a single circular ultrasonic oscillation element. Any of these types of probes is greater in the area of the oscillation element, but smaller in the impedance, than the ultrasonic probe for electronic scan. As set out above, the transmit/receive circuit is optimally designed with respect to the ultrasonic probe for electronic scan and, even if the mechanically scan type ultrasonic probe is driven with the transmit/receive circuit operated without being modified, the load (ultrasonic oscillation element) drive capability and S/N ratio at the receive system are lowered, making it difficult to collect the ultrasonic wave information of the subject in a high S/N ratio. It is necessary, at any rate, to provide an extra transmit/receive circuit for the mechanical scan type ultrasonic probe only. However, if such a type is so provided, then the resultant apparatus becomes large in size and high in cost.

SUMMARY OF THE INVENTION

It is accordingly the object of the present invention to provide a low-cost, small-sized ultrasonic diagnostic apparatus which allows the use of not only an electronic scan type ultrasonic probe but also another type of ultrasonic probe such as a mechanical scan type with ultrasonic oscillation elements smaller in number than the number of channels of a transmit/receive circuit and which can improve the S/N ratio of ultrasonic wave information.

In order to solve the aforementioned problem, according to the present invention, an ultrasonic diagnostic apparatus is provided which includes a transmit/receive circuit having a plurality of transmit channels for allowing a drive pulse to be applied to a corresponding ultrasonic oscillation element and a plurality of receive channels for allowing the processing of ultrasonic echo signals and allows the use of an ultrasonic probe having ultrasonic oscillation elements smaller in number than the number of channel of the transmit/receive circuit, in which at least one of first and second units are provided, the first unit enabling a plurality of transmit channel output terminals to be connected in a parallel connection unit to a corresponding ultrasonic oscillation element to operate ultrasonic oscillation elements in parallel fashion and the second unit enabling a plurality of receive channel input terminals to be connected in a parallel connection unit to a corresponding ultrasonic oscillation element to receive the same ultrasonic echo signal via a corresponding plurality of channels for processing. Here a protective resistor may be provided for the transmit channel to protect an associated circuit from excess current.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

FIG. 1 shows an equivalent circuit for explaining a basic principle on which a plurality of pulsers on a transmit side of an ultrasonic diagnostic apparatus are connected in parallel with a corresponding ultrasonic oscillation element to equivalently lower an output impedance;

FIG. 2 shows an equivalent circuit for explaining a basic principle on which a plurality of receive channel input terminals on a receive side of the ultrasonic diagnostic apparatus are connected in parallel with a corresponding ultrasonic oscillation element to improve a reception sensitivity;

FIG. 6 is a circuit diagram showing an apparatus according to another embodiment of the present invention in which a protective resistor is provided for each channel to protect an associated circuit from excess current; and FIG. 7 is an equivalent circuit corresponding to the circuit diagram shown in FIG. 6.

DETAILED DESCRIPTION OF THE PREFERRED EMBODIMENTS

Figure 3:
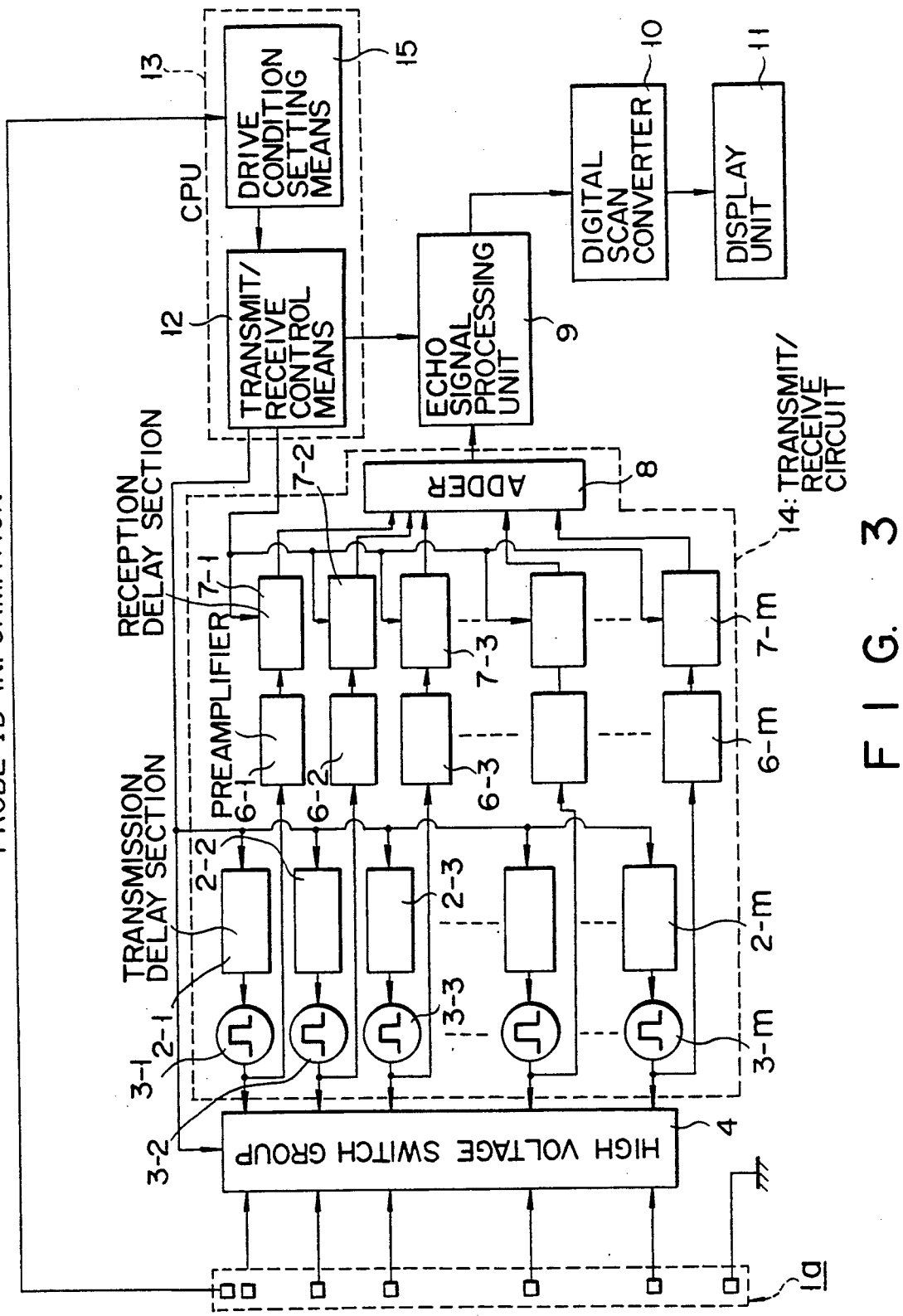
FIG. 3 is a block circuit diagram showing an ultrasonic diagnostic apparatus according to one embodiment of the present invention.

An ultrasonic diagnostic apparatus according to one embodiment of the present invention will be explained below with reference to the accompanying drawings.

The ultrasonic diagnostic apparatus of the present invention includes a transmit/receive circuit common to an ultrasonic probe for electronic scan and an ultrasonic probe for mechanical scan, in which the transmit/receive circuit includes a first connecting means enabling a plurality of transmit channel outputs to be connected in a parallel connection unit to a corresponding one of a plurality of ultrasonic oscillation elements for the ultrasonic probe to drive the ultrasonic oscillation elements in a parallel fashion and a second connecting means enabling a plurality of receive channel input terminals to be connected in a parallel connection unit to a corresponding one of the ultrasonic oscillation elements for the ultrasonic probe to receive a corresponding ultrasonic echo signal through the plurality of the channels, in which case the object of the present invention can be achieved by either one or both of the first and second connecting means.

The basic principle of the first connection means enabling a plurality of transmit channel output terminals to be connected in a parallel connection unit to a corresponding ultrasonic oscillation element will be explained below with the use of an equivalent circuit as shown in FIG. 1. In FIG. 1, $V_P$ shows a pulser's output voltage (an internal electromotive force) for each transmit channel; $Z_P$, an output impedance of the pulse; $Z_L$, an input impedance of the ultrasonic oscillation element.

Here, with consideration paid to one pulser, a voltage $V'_L$ across the ultrasonic oscillation element is given below:

$$V_L = \frac{Z_L}{Z_P + Z_L} \cdot V_P$$

and $$V_L = V_P/2$$

under the condition of, for example, $Z_L = Z_P$.

With an M number (M=2, 3, 4, ...) of pulsers connected in a parallel array as shown in FIG. 1, on the other hand, a voltage $V_L$ across the ultrasonic oscillation elements is given below:

$$V_L = \frac{Z_L}{\frac{Z_P}{M} + Z_L} \cdot V_P$$

Under a parallel condition of a plurality of $Z_P$'s, $$Z_L > > Z_P/M$$

Since $V_L = V_P$, it is possible to disregard a voltage drop which is caused by the output impedance $Z_P$ of the pulser. If a plurality of transmit channel output terminals are connected in a parallel connection unit to a corresponding ultrasonic oscillation element, the load drive capability of the transmit circuit is improved and the transmit level of the ultrasonic wave is increased. Thus the S/N ratio of the ultrasonic wave information is improved due to an increase in the receive level of a corresponding signal.

FIG. 2 shows an equivalent circuit corresponding to the case where the second connection means enables a plurality of receive channel input terminals to be connected in a parallel connection unit to a corresponding ultrasonic oscillation element. In FIG. 2, $Z_S$ shows an output impedance of the ultrasonic oscillation element; $V_S$, an output signal voltage (received echo not containing a noise); and $V_N$, a noise voltage. AMP shows a preamplifier (amplification factor $A_V=1$) at the respective receive channel and ADD shows an adder. $V_S$ and $V_N$ are applied to an M number (M=2, 3, 4, ...) of preamplifiers simultaneously. In this case, since the signal components have a correlation to each other, an addition is effected by M times, but because of no correlation among the noise components of the preamplifiers an addition is effected by $\sqrt{M}$ times. When the calculated input noise $V_{ni}$ of the preamplifier (AMP) is greater than the output noise $V_N$ of the ultrasonic oscillation element, the output voltage $V_{out}$ is expressed as:

$$V_{out} = M(V_S + V_N) + \sqrt{MV_{ni}}$$

Thus the S/N ratio of the receive system becomes:

$$S/N = M \cdot V_S / \sqrt{(MV_N)^2} + \sqrt{(MV_{ni})^2}$$

Thus the S/N ratio of the receive system is improved at $V_N < V_{ni}$.

Here the transmit/receive circuit including a plurality of pulsers, a plurality of preamplifiers and adder is originally for an electronic scan type ultrasonic probe only and is not a newly added one. According to the present invention, therefore, it is possible to provide a compact ultrasonic diagnostic apparatus at low costs which permits the use of an ultrasonic probe with channels smaller in number than the channels of the transmit/receive circuit, such as an ultrasonic probe for mechanical scan.

It is possible to provide an improved load (ultrasonic oscillation element) drive capability or an improved transmit S/N ratio and hence to provide an improved S/N ratio of the ultrasonic wave information on the whole apparatus. Ideally, the first and second means are both used advantageously, but the object of the present invention can be achieved using either one of the first and second means.

The embodiment of the present invention adopting the aforementioned basic principle will be explained below with reference to FIGS. 3 to 7.

FIG. 3 is a block diagram showing an ultrasonic diagnostic apparatus according to one embodiment of the present invention. In FIG. 3, 1a shows a connector by which an ultrasonic probe is detachably connected to an apparatus body. 2-1 to 2-m show transmission delay sections each delaying the drive timing of a corresponding oscillation element of an ultrasonic probe and 3-1 to 3-m show pulsers each generating a drive pulse for use in the oscillation of the corresponding oscillation element. 4 shows a high voltage switch group for switching connection of the oscillation elements. 6-1 to 6-m show preamplifiers each amplifying an echo signal (ultrasonic information) which is input from the corresponding oscillation element via the high voltage switch group 4. 7-1 to 7-m show reception delay sections which delay the outputs of the preamplifiers 6-1 to 6-m. 8 shows an adder for adding the outputs of the reception delay sectors 7-1 to 7-m. 9 shows an echo signal processing unit for receiving an output of the adder 8 and processing an echo signal. 10 shows a digital scan converter mainly composed of a frame memory and 11 shows a display unit for visually displaying the output of the digital scan converter 10.

The pulsers 3-1 to 3-m, transmission delay sections 2-1 to 2-m, preamplifiers 6-1 to 6-m, preamplifiers 6-1 to 6-m, reception delay circuits 7-1 to 7-m and adder 8 constitute a transmit/receive circuit 14.

Probe ID information for identifying the types of ultrasonic probes is identified by a CPU 13. CPU 13 functionally has a transmit/receive control means 12 and drive condition setting means 15. Transmit/receive control means 12 controls the high voltage switch group 4, transmission delay sections 2-1 to 2-m, reception delay sections 7-1 to 7-m and so on. The drive condition setting means 13 determines the types of ultrasonic probe of interest on the basis of the probe ID information and performs the drive condition setting operation of the ultrasonic probe in accordance with the result of the identification.

Figure 4:
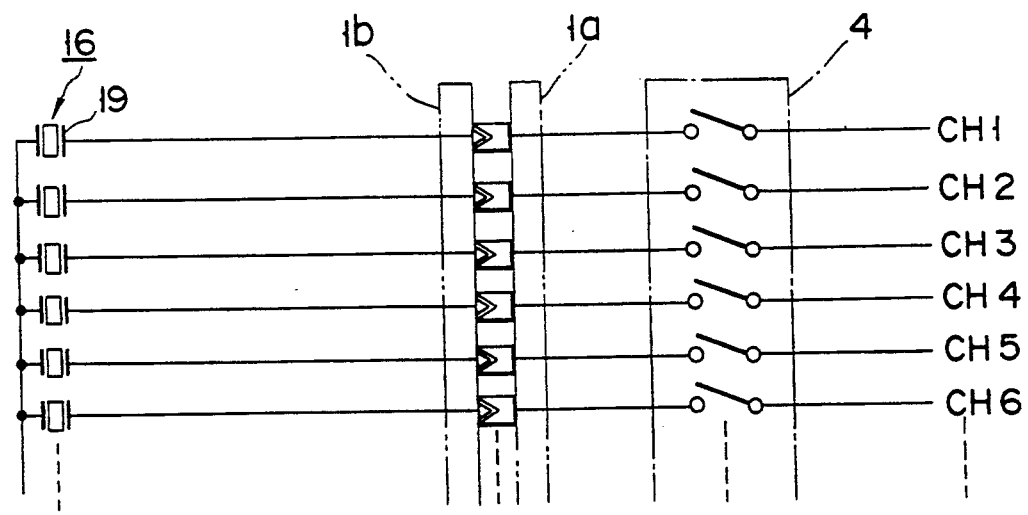
FIG. 4 is a circuit diagram showing a connection state when an ultrasonic probe for electronic scan is used for the embodiment shown in FIG. 3.

FIG. 4 shows a state in which an ultrasonic probe 16 for electronic scan is connected by connectors 1a, 1b to an apparatus body, noting that 1a and 1b show a connector on the apparatus body side and a connector on the probe side, respectively. The ultrasonic probe 16 is composed of an array of oscillation elements 19 and can perform a linear scan by the ON-OFF switching of the high voltage switch group 4.

Figure 5:
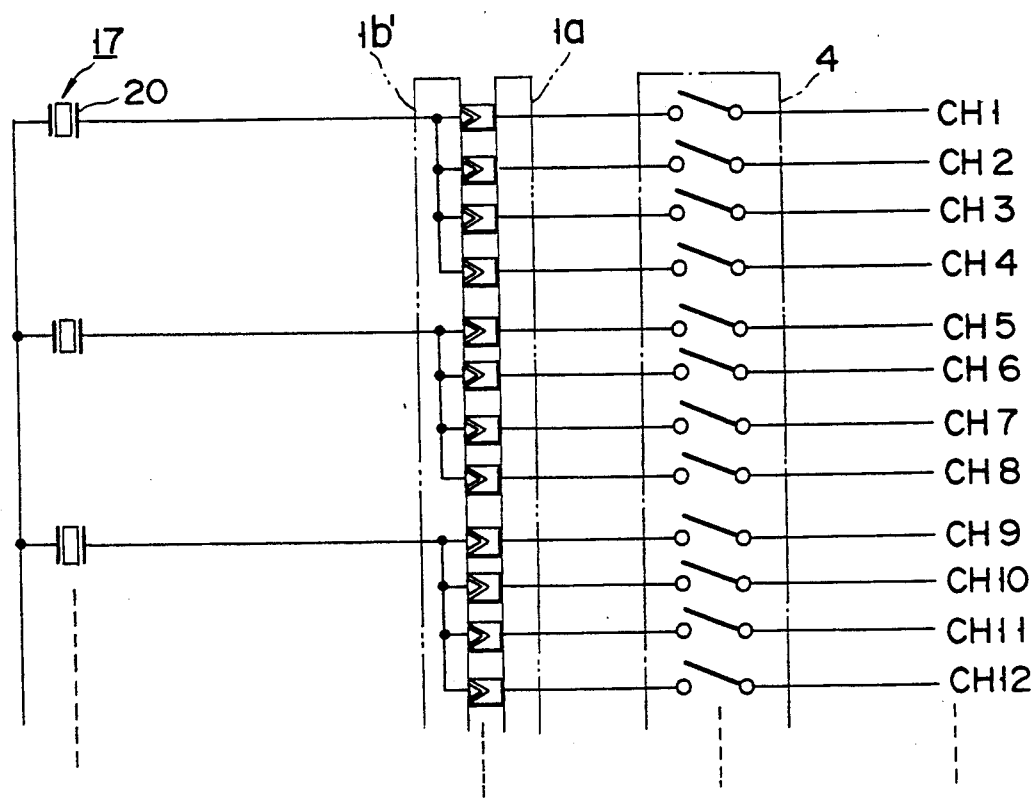
FIG. 5 is a circuit diagram showing a connection state when an ultrasonic probe for mechanical sector scan is used for the embodiment shown in FIG. 3.

FIG. 5 shows a state in which an annular array type ultrasonic probe 17 for mechanical sector scan is connected by connectors 1a, 1b' to the apparatus body. The ultrasonic probe 17 is composed of a concentric array of ring-like ultrasonic oscillation elements 17. The number of the ultrasonic oscillation elements 20 in the ultrasonic probe 17 is smaller than that of channels of the transmit/receive circuit 14. In the probe-side connector 1b', channels are connected with every four channels as a parallel array unit and the high voltage switch group 4 is corresponding driven, in a four channel unit, under control of the transmit/receive control means 12. That is, with the high voltage switch group 4 ON, the transmit channel output terminals corresponding to the four channels or the receive channel input terminals corresponding to the four channels are connected to a corresponding ultrasonic oscillation element in the aforementioned parallel unit, noting that the transmit channel output terminals and receive channel input terminals correspond to the pulser output terminals and preamplifier output terminals, respectively. The aforementioned first and second connection means are implemented via the probe side connector 1b' and high voltage switch group 4 with the connector pins short-circuited in a manner shown in FIG. 5.

The operation of the present apparatus thus constructed will be explained below.

When an ultrasonic probe 16 for electronic scan is mounted on the apparatus body (see FIG. 4), it is identified by the drive condition setting means 15 in CPU 13 and a linear scan is implemented under control of the transmit/receive control means 12 to obtain ultrasonic information. The information thus obtained is processed by the echo signal processing unit 9 and displayed on the display unit 11 via the digital scan converter 10. In this case, the operation of each section is the same as that in the case of the conventional apparatus.

When an ultrasonic probe 17 for mechanical sector scan is mounted on the apparatus body (see FIG. 5), it is identified by the drive condition setting means 15 in CPU 13 and a mechanical sector scan is implemented under control of the transmit/receive control means 12. In the present embodiment, of the pulsers 3-1 to 3-m, the corresponding four pulsers are connected in a parallel unit to the corresponding ultrasonic oscillation element in the ultrasonic probe 17 when an ultrasonic wave transmit mode is involved. Of the preamplifiers 6-1 to 6-m, the corresponding four preamplifiers are connected in a parallel unit to the corresponding ultrasonic oscillation element when an ultrasonic wave receive mode is involved. That is, the transmit channel output terminals and receive channel input terminals are connected in four channel units or a parallel connection unit to the oscillation element, respectively, by the operation of the high voltage switch group 4. In this way, the respective ultrasonic oscillation element is driven by the four transmit channels (a four parallel unit) in the transmit mode and corresponding ultrasonic echoes are received by the corresponding four receive channels in the receive mode. It is, therefore, possible to improve a load (ultrasonic oscillation element) drive capability and to improve an S/N ratio on the receive side.

In the mechanical sector scan by the probe 17, the delay times of the transmit delay sections 2-1 to 2-m and receive delay sections 7-1 to 7-m are equal among those channels which are connected in the parallel connection unit to the corresponding ultrasonic oscillation element.

In the present embodiment, a plurality of pulser output terminals and preamplifier input terminals are connected in the parallel connection unit via the high voltage switch group 4 and, in spite of the transmit/receive circuit 14 dedicated to the ultrasonic probe for electronic scan, it is possible to optimize an annular array type ultrasonic probe and hence to collect better ultrasonic information. It is possible to eliminate a need for a large-sized apparatus of a higher cost, because it is not necessary to provide any transmit/receive circuit of an ultrasonic probe only for mechanical sector scan.

An apparatus according to another embodiment of the present invention will be explained below.

Although in the aforementioned embodiment a plurality of transmit channel output terminals are connected in a parallel connection unit to the corresponding ultrasonic oscillation element, if there is, for example, a delay time variation among the transmit channels or an operation error, the corresponding transmit channel output terminals are equivalent to the case where they are short-circuited. Thus there is a risk that, in such a case, excess current will flow or a circuit leakage will occur.

In order to prevent such an occurrence, a protective resistor 21 may be provided for each channel to avoid such excess current in the transmit channel. The protective resistor 21, if being connected in series with the transmit channel output terminal, may be provided at any proper location, but it is better to provide the protective resistor on the ultrasonic probe side or, in a practical application, within the probe-side connector 1b'. By so doing, the protective resistor 21 is connected in series with the transmit channel output terminal, only if an annular array type ultrasonic probe 17 for mechanical sector scan is used, and it is possible to exclude the action of the protective resistor 21 when switching is made to another type of ultrasonic probe.

The value of the protective resistor is determined as set out below.

FIG. 7 shows an equivalent circuit corresponding to a parallel circuit of the transmit channel output terminals and ultrasonic oscillation element in the arrangement of FIG. 6. In FIG. 7, $V_{Pl}$ to $V_{PM}$ each show a pulse output voltage for the respective transmit channel; $Z_P$, the output impedance of the pulser and $Z_L$, the input impedance of the ultrasonic oscillation element.

With a maximum current at a transmit time, the value of the protective resistor 21 and a voltage (pulse height) of a transmit pulse represented by $I_{MAX}$, R and $V_H$, respectively, R can be found from the following relations:

$$R_O \approx V_H / I_{MAX}$$

$$R_O \approx R + Z_P$$

As shown in FIG. 6, for example, if the delay time of only CH1 of CH1 to CHM varies, a current $I_l$ flows due to $V_{Pl}$. The maximum value $I_{1MAX}$ of $I_l$ is given below.

$$I_{1MAX} = \frac{V_1}{(R_O + Z)}$$

, provided $R_O = Z_P + R$ $$Z = \frac{R_O}{3} // Z_L$$

Thus $R \geq R_O - Z_P \approx \dfrac{V_1}{I_{1MAX} - \dfrac{V_1}{Z}}$

It is only necessary to determine the value of R so that the equation above may be satisfied. In this connection, care should be taken that, with a too great increase in R, a great drop in load drive capability results.

The provision of the protective resistor 21 prevents a flow of excess current through an associated circuit even if an operation error occurs due to, for example, a variation in the delay of the delay circuit and a disturbance noise. It is thus possible to prevent a breakage of the circuit. Further, although, with the presence of the protective resistor 21, the load drive capability is somewhat lowered compared with the case of the aforementioned embodiment, the protective resistor 21 can be substantially disregarded at the time of reception. The present embodiment is equal to the preceding embodiment with respect to improving the S/N ratio when a plurality of receive channel input terminals are connected in a parallel connection unit to the corresponding ultrasonic oscillation element. The S/N ratio of the ultrasonic wave information is improved over that of the conventional apparatus.

Although the present invention has been explained in conjunction with the aforementioned embodiments, various changes or modifications of the present invention may be made without departing from the spirit and scope of the present invention.

Although the aforementioned embodiments have been explained in conjunction with utilizing an annular array type ultrasonic probe for mechanical sector scan, for example, the present invention can be applied to not only an ordinary ultrasonic probe for electronic scan but also any ultrasonic probe with the number of channels smaller than that of the transmit/receive circuit 14. In a single type ultrasonic probe for mechanical scan which does not require the use of the transmit/receive delay times, all that is required is to set the respective delay times to zero.

Although the aforementioned embodiment has been explained as identifying the types of ultrasonic probes on the basis of the probe ID information and controlling the operation of the high voltage switch group 4 in accordance with the result of identification, switches may be provided on an operation panel of the apparatus to correspond to the types of ultrasonic probes and, in this case, a drive condition may be set to the apparatus by the operation of the switch.

Although in the aforementioned embodiment the first and second means are implemented via the high voltage switch group 4, it may be possible to omit one of the parallel connection means of the first and second means.

The present invention can also be applied to an apparatus not including the high voltage switch group 4. That is, even in an ultrasonic diagnostic apparatus having a transmit/receive circuit corresponding to one of available probes which is equipped with the greatest number of ultrasonic oscillation elements and adapted to perform an ultrasonic wave transmission and reception in ON-OFF fashion, it is possible to drive the ultrasonic oscillation elements in a parallel drive mode set out above and to receive a corresponding ultrasonic echo signal via a plurality of channels for processing. In this case, it is possible to obtain the same advantage as set forth above. The first and second means are provided through the probe-side connector and ultrasonic wave transmit/receive ON-OFF control unit for the transmit/receive circuit in a manner set forth above.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An ultrasonic diagnostic apparatus comprising:
   transmit/receive circuit means including a plurality of transmit channels for enabling a drive pulse to be applied to a corresponding ultrasonic oscillation element and a plurality of receive channels;
   ultrasonic probe means having at least one ultrasonic oscillation element which is smaller in number than the number of the transmit channels and that of receive channels in the transmit/receive circuit means; and
   connector means for selectively connecting a plurality of transmit channel output terminals to the ultrasonic oscillation element in parallel fashion to drive the ultrasonic oscillation element or connecting a plurality of receive channel input terminals to the ultrasonic oscillation element in parallel fashion to receive corresponding ultrasonic echo signals from the plurality of receive channels for processing.

2. The ultrasonic diagnostic apparatus according to claim 1, wherein said transmit channels contain a protective resistor each to protect an associated circuit from excess current.

3. The ultrasonic diagnostic apparatus according to claim 2, wherein said protective resistor is provided on an ultrasonic probe side.

4. An ultrasonic diagnostic apparatus comprising:
transmit/receive circuit means including a plurality of transmit channels for enabling a drive pulse to be applied to a corresponding ultrasonic oscillation element and a plurality of receive channels;
ultrasonic probe means having at least one ultrasonic oscillation element smaller in number than the number of transmit channels and that of receive channels on the transmit/receive circuit; and
connector means for enabling a plurality of transmit channel output terminals to be connected to the ultrasonic oscillation element in parallel fashion to drive the ultrasonic oscillation element and for enabling the receive channel input terminals to be connected to the ultrasonic oscillation element in parallel fashion to receive corresponding ultrasonic echo signals for processing.

5. The ultrasonic diagnostic apparatus according to claim 4, wherein a protective resistor is provided in a corresponding transmit channel to protect an associated circuit from excess current.

6. The ultrasonic diagnostic apparatus according to claim 5, wherein said protective resistor is provided on an ultrasonic probe side.

7. An ultrasonic diagnostic apparatus comprising:
transmit/receive circuit means including a plurality of transmit channels for enabling a drive pulse to be applied to a corresponding ultrasonic oscillation element and a plurality of receive channels;
ultrasonic probe means having at least one ultrasonic oscillation element smaller in number than the number of the transmit channels and that of the receive channels on the transmit/receive circuit means; and
connector means for connecting a plurality of transmit channel output terminals to the ultrasonic oscillation element in parallel fashion to drive the ultrasonic oscillation element in parallel fashion.

8. The ultrasonic diagnostic apparatus according to claim 7, wherein a protective resistor is provided for the transmit channel to protect an associated circuit from excess current.

9. The ultrasonic diagnostic apparatus according to claim 7, wherein said protective resistor is provided on an ultrasonic probe side.

10. An ultrasonic diagnostic apparatus comprising:
transmit/receive circuit means including a plurality of transmit channels for enabling a drive pulse to be applied a corresponding ultrasonic oscillation element and a plurality of receive channels;
ultrasonic probe means having at least one ultrasonic oscillation element, smaller in number than the number of the transmit channels and that of the receive channels on the transmit/receive circuit means; and
connector means for enabling a plurality of receive channel input terminals to be connected to the ultrasonic oscillation element in parallel fashion to receive corresponding ultrasonic echo signals from the corresponding receive channels for processing.

* * * * *